United States Patent

[11] 3,577,832

| [72] | Inventor | David Parsons |
| | | Warwickshire, England |
| [21] | Appl. No. | 792,199 |
| [22] | Filed | Dec. 30, 1968 |
| [45] | Patented | May 4, 1971 |
| [73] | Assignee | Automotive Products Company Limited |
| | | Warwickshire, England |
| [32] | Priority | Jan. 12, 1968 |
| [33] | | Great Britain |
| [31] | | 1985-68 |

[54] FLUID PRESSURE OPERATED SERVO DEVICES
2 Claims, 1 Drawing Fig.

[52] U.S. Cl. .................................................. 92/98
[51] Int. Cl. .................................................. F16j 3/00
[50] Field of Search .......................................... 92/98, 98
(RP), 99; 91/369, 369 (A), 369 (B)

[56] References Cited
UNITED STATES PATENTS

| 2,989,035 | 6/1961 | Stelzer | 92/99X |
| 3,082,744 | 3/1963 | Gardner | 91/369X |
| 3,155,012 | 11/1964 | Ayers | 92/99X |
| 3,183,789 | 5/1965 | Stelzer | 91/369 |
| 3,198,089 | 8/1965 | McGay | 92/99X |
| 3,352,209 | 11/1967 | Cripe | 92/99X |

Primary Examiner—Martin P. Schwadron
Assistant Examiner—Leslie J. Payne
Attorney—Lawrence J. Winter ABSTRACT: A flexible diaphragm providing a fluidtight partition between chambers in a fluid servomotor casing is held against movement of its inner edge away from a rigid member axially movable in the casing by a washer mounted on a cylindrical surface of said rigid member to form, with an annular surface on said member, a radially outwardly convergent channel enclosing a bead on that edge of the diaphragm.

Patented May 4, 1971
3,577,832
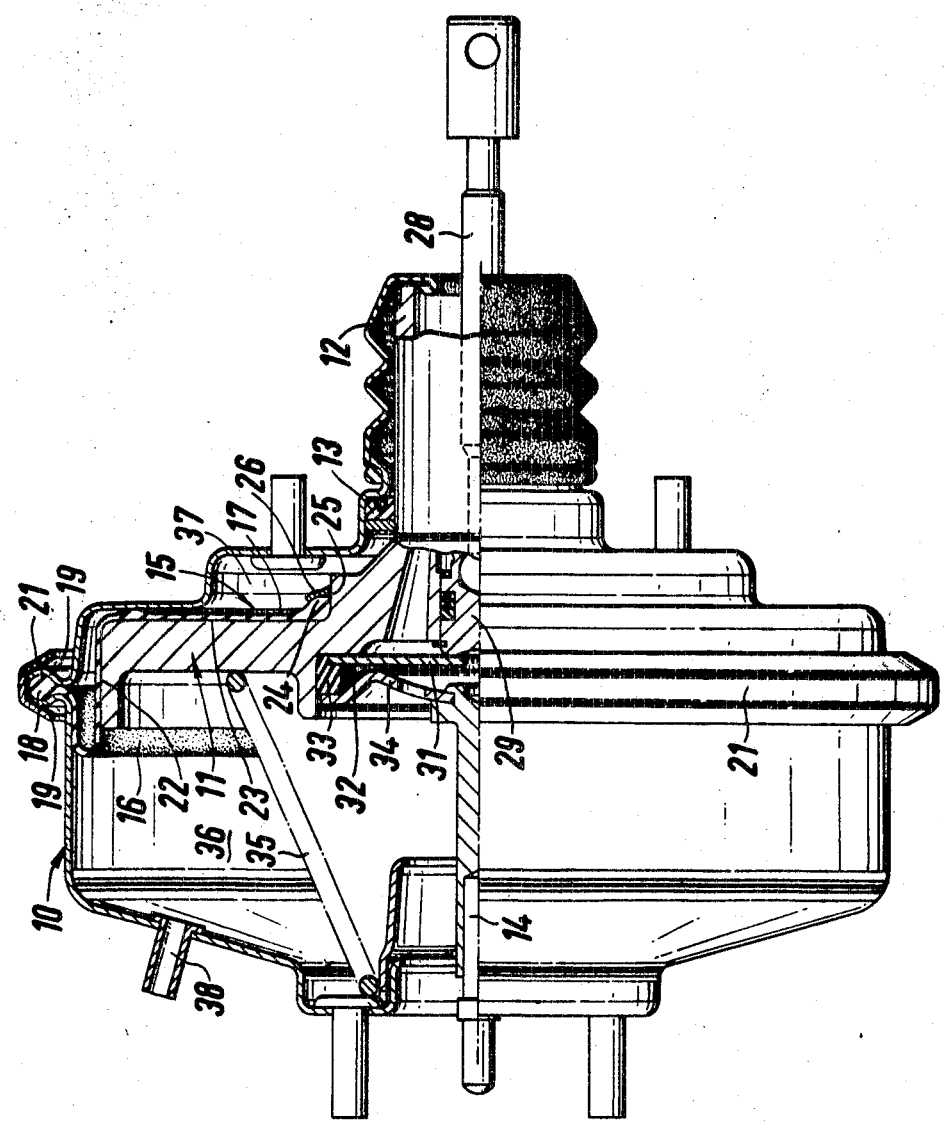
INVENTOR
David Parsons
BY Lawrence J Winter
ATTORNEY

FLUID PRESSURE OPERATED SERVO DEVICES

This invention relates to fluid pressure operated servodevices especially for use in connection with braking systems of vehicles for augmenting the effort exerted by the driver to apply the brakes and thus reducing the physical effort required to provide a given degree of braking.

In such servodevices, it is common to provide a movable wall to which a pressure differential is applied to create a thrust which is transmitted to a brake-operating system, for example to the master cylinder of a liquid pressure-braking system.

In the so-called "vacuum suspended" type of servodevice, the movable wall divides a casing into two chambers, one of which is permanently connected to a source of suction, such as the inlet manifold of a vehicle engine or an exhauster, the other chamber being connected to the first chamber when the servodevice is inoperative, and to the atmosphere when a pressure differential is to be produced.

The movable wall commonly consists of an annular flexible diaphragm secured at its outer edge to the casing and at its inner edge to a rigid axially movable member which transmits the thrust exerted on the diaphragm to the braking system.

If the engine or exhauster is not in operation, air is trapped in the first chamber, and if the movable wall is moved in the brake operating direction, this trapped air resists movement of the diaphragm and tends to detach it from its anchorage at one edge. The outer edge of the diaphragm is usually firmly clamped between portions of the casing, but its inner edge is commonly located in a circumferential groove in a rigid central member, so the resistance to movement tends to pull the said inner edge out of the groove.

It is the object of the present invention to provide an improved attachment of the inner edge of the diaphragm to the rigid axially movable member, which will prevent the said edge from becoming detached.

According to the invention, in a fluid pressure-operated servodevice comprising a casing, a rigid member axially movable in said casing, and a flexible diaphragm providing a fluidtight partition between chambers in said casing, the inner edge of said diaphragm is formed with a circumferential bead which is located in the angle between an external cylindrical surface on the rigid member and an annular surface extending outwardly from said cylindrical surface, and is retained in position in the said angle by a washer of dished or frustoconical form which is mounted on the said cylindrical surface and held in a position thereon so as to provide, with the said annular surface, a radially outwardly convergent channel enclosing the bead.

One embodiment of the invention will now be described with reference to the accompanying drawing, the single FIGURE of which is a longitudinal section through a fluid FIGURE servodevice.

Referring to the drawing, the fluid pressure-operated servodevice comprises a generally cylindrical casing 10 in which is mounted for axial movement a rigid circular plate 11 having integral with it a sleeve 12 which extends outwardly through an opening in one end wall of the casing 10, a packing ring 13 being provided in the opening to prevent the entry of air to the casing. A push rod 14, moved axially by the plate 11, extends through an opening in the other end wall of the casing 10 to actuate the piston of a liquid pressure master cylinder (not shown) mounted on that end wall of the casing.

A flexible diagram 15 having an outer generally cylindrical portion 16 and a central flat portion 17 has, at its outer edge, a circumferential bead 18 clamped between curved flanges 19 on two separate metal pressings forming the casing 10, the flanges being held together to retain the bead 18 between them by a clamping ring 21. The circular plate 11 has an external cylindrical surface 22, and, as the said plate moves axially in the casing, the generally cylindrical portion 16 of the diaphragm rolls from the internal surface of the casing onto this cylindrical surface 22, or vice versa. The flat portion of the diaphragm lies against a flat annular surface 23 on the plate 11 and has, at its inner edge, a circumferential bead 24 which lies in the angle between the annular surface 23 and an external cylindrical surface 25 of the plate 11. A metal washer 26, of dished form, having an inner diameter such that it is an interference fit on the cylindrical surface 25, is press fitted onto the said cylindrical surface so as to define with the annular surface 23, a channel which converges in width in a radially outward direction and thus encloses and positively traps the bead 24 on the diaphragm to prevent it from being displaced.

The metal washer 26 may be of frustoconical shape instead of being dished, and may be held in position by a clip ring or other means instead of being an interference fit on the cylindrical surface, but the use of an interference fit has been found to be a very satisfactory and economical arrangement.

A valve, not shown, is provided in the sleeve 12 and is operated, for example through a mechanical linkage (not shown) by a brake pedal, the linkage being connected to a pushrod 28 extending into the sleeve and engaging a plunger 29 slidable therein. The valve may be of any suitable form, many forms of valve for this purpose being known. The plunger 29 is acted on by the inner ends of a plurality of radial levers 31, the outer ends of which are held against the end surface of a recess 32 in the plate 11 by a resilient ring 33 supporting the outer periphery of an apertured disc 34 carrying the pushrod 14.

A spring 35 urges the plate 11 towards the end wall of the casing 10 through which the sleeve 12 extends.

The diaphragm 15 divides the casing 10 into two chambers 36 and 37, the chamber 36 being permanently connected at 38 to a source of suction such as the inlet manifold of a vehicle engine or an exhauster. The valve, when the servodevice is inoperative connects the chambers 36 and 37 one to the other, and closes an air inlet through the sleeve 12. To actuate the servodevice, the pushrod 28 is moved inwardly of the sleeve 12, isolating the chamber 37 from the chamber 36 and connecting the said chamber 37 to the air inlet, so that air pressure in the chamber 37 acts on the diaphragm 15 to move the plate 11 in a direction to apply thrust through the pushrod 14 to the master cylinder piston. As the thrust builds up, the resilient ring 33 is compressed until a circular bulge on the disc 34 engages the levers 31 and transmits through them to the plunger 29 and pushrod 28 a reaction thrust proportional to the thrust exerted by the servodevice.

If the pedal or other control were actuated when the engine or exhauster was not in operation, air would be trapped in the chamber 36, and, since the plate 11 would be moved to reduce the volume of that chamber, the trapped air would tend to resist movement of the diaphragm with the said plate, and so exert a force which would tend to pull the inner edge of the diaphragm away from its fixing on the plate. Since the bead is positively located however, the diaphragm 15 would not become detached from the plate, as it would be liable to do if it were not positively located, but were merely retained by its own resilience in a parallel-sided groove.

The diaphragm bead 24 is preferably of such an internal diameter that it is slightly stretched when fitted on the surface 25. With the arrangement according to the present invention, the resilience of the bead 24 can be less than would be necessary if it was required to be an interference fit in a groove formed in the surface 25, as was the case in previously used arrangements.

I claim:

1. A fluid pressure-operated servodevice comprising a casing with a rigid member disposed therein comprising a circular plate, movable axially of said casing, said plate having a flange facing in one direction adjacent its outer circumference forming a cylindrical surface, said plate extending radially inwardly adjacent the inner end of said flange to form an elongated flat surface, said plate terminating adjacent its central portion in a central cylindrical surface forming a right angle with radial extending flat surface, said central cylindrical surface extending in a direction opposite to said flange, a flexible diaphragm seated on said flange, radial surface and central cylindrical surface, a circumferential bead on the outer edge of said diaphragm, clamping flanges and a clamping ring encompassing said bead to secure it to the casing, an enlarged bead of concave-convex configuration on the inner edge of said diaphragm seated in said right angle, and a washer of concave-convex configuration secured on said central cylindrical surface and pressing against the outer surface of said enlarged bead to secure it in said right angle.

2. A fluid pressure-operated servodevice according to claim 1, wherein the said washer is an interference fit on the cylindrical surface.